Figure 1:
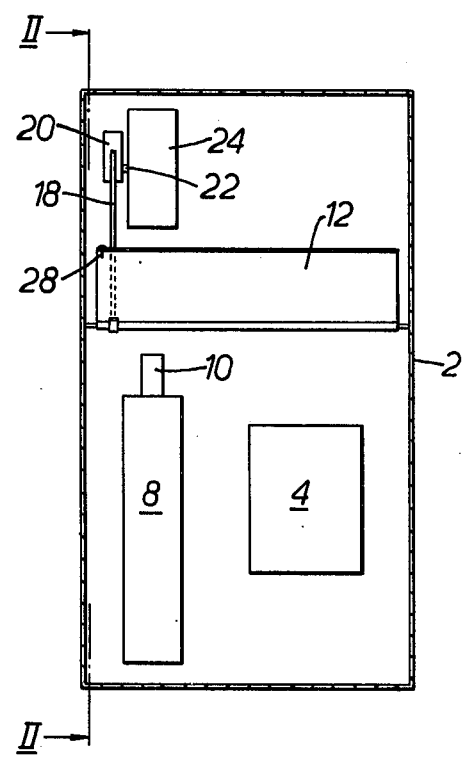

United States Patent [19]
Luknar

[11] 4,190,866
[45] Feb. 26, 1980

[54] SURVEILLANCE DEVICE INCORPORATING A TELEVISION CAMERA

[76] Inventor: Amiel Luknar, 28 Allerton Rd., London, N.16, England

[21] Appl. No.: 846,201

[22] Filed: Oct. 27, 1977

[30] Foreign Application Priority Data

Oct. 30, 1976 [GB] United Kingdom ............... 45233/76

[51] Int. Cl.² .................. G03B 37/00; H04N 5/26; H04N 5/30; H04N 7/18
[52] U.S. Cl. ..................................... 358/229; 354/95; 358/108; 358/225
[58] Field of Search ............... 358/108, 210, 225, 229; 354/95

[56] References Cited

U.S. PATENT DOCUMENTS

| | | | |
|---|---|---|---|
| 2,481,082 | 9/1949 | Chew | 358/225 |
| 3,482,037 | 12/1969 | Brown | 358/108 |
| 3,546,378 | 12/1970 | Karikawa | 358/225 |
| 3,701,100 | 10/1972 | Yarbrough | 358/108 |
| 3,816,654 | 6/1974 | Brightman | 358/108 |
| 3,868,706 | 2/1975 | Steingold | 358/225 |
| 3,919,475 | 11/1975 | Dukich | 358/229 |

Primary Examiner—Howard W. Britton
Attorney, Agent, or Firm—Fleit & Jacobson

[57] ABSTRACT

Compact surveillance device including a miniature television camera mounted with its optical axis vertical, and a mirror mounted above the lens so that the camera views the area to be surveyed, such as the area outside the door of an office, through a window in the front of the body of the device. The mirror is pivotally mounted about a horizontal axis and can be moved slowly about the axis by an electric motor to provide a "scanning" effect, so that the device scans the surveillance area with an up-and-down movement.

8 Claims, 2 Drawing Figures

U.S. Patent  Feb. 26, 1980  4,190,866

SURVEILLANCE DEVICE INCORPORATING A TELEVISION CAMERA

This invention relates to security systems for the entrances of premises, of the kind which provide the occupant of the premises with the means for communicating with a visitor to the premises before he is admitted. It is particularly concerned with systems of the kind which include a television camera as well as the usual microphone/loudspeaker system, so that the occupant can view the visitor on a television monitor inside the premises. Such a system is referred to hereinbelow as "a security system of the type herein described". A number of such systems have been proposed and installed, particularly, in the recent past, since television equipment has become considerably more compact, but most of the known systems are still relatively bulky, and therefore awkward to install, because of the necessity for arranging the television camera with its optical axis horizontal and approximately at eye level. This means that a rather deep and bulky casing has to be accomodated next to the entrance of the premises, or that it tends to be unsightly and nearly always creates an inconvenient obstruction.

Such systems also suffer from the disadvantage that it is usually impossible, particularly in a confined space such as a narrow corridor, to include more than the head and shoulders of the visitor in the field of view of the camera. Unfortunately even the provision of a very wide-angle lens such as a "fish-eye" type of lens does not solve this problem adequately, because the width of the image is greatly reduced as well as its height and usually the proximity of the camera to the visitor give rise to very great distortion with this type of lens so that most of the resultant image shown on a monitor is much too small and quite inadequate in quality. In any case, very wide angle lenses are generally considerably more bulky and expensive than lenses of normal focal length.

In order to make the equipment less bulky it has been proposed to arrange the camera pointing upwards with its optical axis vertical, and to incorporate a mirror at about 45° to the horizontal plane, above the lens at about eye-level, so as to achieve a similar effective viewing position to that in equipment which has the camera horizontal whilst reducing the depth of the overall assembly. Such an arrangement still, however, suffers from an inadequate field of view in the vertical direction.

It is an object of the present invention to provide an improved security system of the type including a television camera. which provides a greatly enhanced field of view in an arrangement which is compact and does not require specialised and therefore expensive optical equipment.

A security system of the type herein described, in accordance with the present invention comprises a television camera having a lens, and movable image reflecting means mounted in the optical path of the lens, the reflecting means being so arranged as to be movable, in use, to scan the area which is to be monitored by the equipment.

In a preferred embodiment of the invention, the camera is so mounted in the equipment that in use its optical axis is vertical. The reflecting means is preferably arranged so as to scan the field of view in a vertical direction, so that the height of the effective field of view of the equipment can be greatly increased by comparison with its width. In the preferred embodiment of the invention the image reflecting means comprises a simple plane mirror which is pivoted about a horizontal axis which lies in a plane perpendicular to the optical axis of the lens, and may be moved by drive means coupled to an electric motor.

It will be appreciated that because of the laws of physics governing reflection from plane mirrors, the mirror only needs to be pivoted through half the angle over which it is desired to scan, i.e. if an angle of 90° is to be covered the mirror need only be moved through 45°. Thus a very simple drive coupling can be utilised. It will also be appreciated that because of the scanning action, the width of the image on the monitor screen can be as great as that obtained normally whilst the effective height can be greatly increased, in contrast to the effect achieved with wide-angle lenses which give a very small image.

In a preferred arrangement the electric motor is a miniature type having an output shaft speed of one revolution per minute and the drive coupling to the mirror comprises a wheel eccentrically mounted on the shaft, the periphery of the wheel bearing against the mirror, or a drive member connected to the mirror, and resilient means arranged to keep the wheel and the mirror or the drive member, as the case may be, in contact with one another, the arrangement being such that the rotation of the motor shaft causes a slow swinging movement of the mirror.

The scanning action of the mirror may be initiated automatically or separately under remote control from the position of the television monitor inside the premises.

Figure 2:
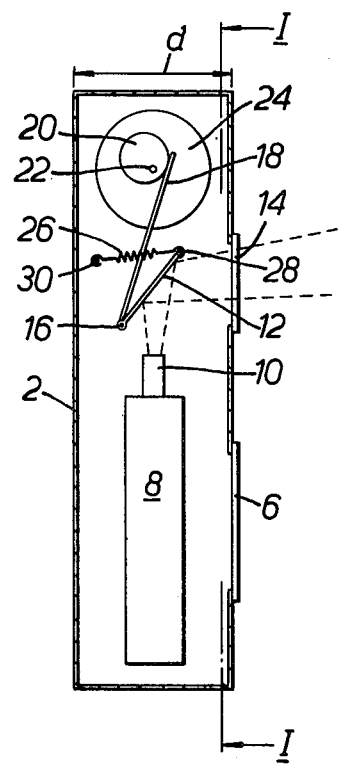

One embodiment of the invention will now be described by way of example with reference to the accompanying drawings, in which:

FIG. 1 is a vertical cross-section through a device according to the invention, taken on the line I—I of FIG. 2 so as to show the internal layout of the component parts; and FIG. 2 is a transverse vertical cross-section taken on the line II—II of FIG. 1.

Referring to the drawings, the apparatus comprises a shallow rectangular casing 2, which in the preferred arrangement may have a depth d (FIG. 2) of less than three inches, making it simple to install even in relatively restricted corridors, for example. A combined microphone/loudspeaker unit 4 is mounted behind a grille 6 and when a visitor approaches the apparatus and presses a bell or buzzer (which may be incorporated in the unit or may of course be quite separate) the operator of the unit can activate the microphone/loudspeaker unit as is usual with such security devices so as to allow communication with the visitor. A television camera 8 which is mounted in the unit with its optical axis vertical, is also activated when the unit is switched on. The lens 10 of the camera is directed vertically upwards at a mirror 12 which is arranged so that the camera "sees" outwardly through a window 14 in the front surface 16 of the casing.

The mirror 12 is mounted in a metal frame which is pivoted about its lower edge 16 so that it can swing in an arc of suitable size to allow the required vertical field to be scanned by the camera.

An arm 18 is rigidly connected to the mirror frame at the pivoted edge 16 and bears against the periphery of a wheel 20 which is eccentrically mounted on the shaft 22 of a miniature motor 24. The arm 16 is resiliently urged into engagement with the wheel 20 by means of a spring 26 one end 28 of which is attached to the mirror frame and the other end of which is connected the casing of the unit at 30. The motor can be actuated by remote control from the monitor position and may be for example a type supplied by the French manufacturer CROUZET which has a diameter of about 53 mm and a depth of about 22 mm, and an output shaft speed of one revolution per minute.

As will be apparent from a consideration of the mechanical arrangement of the arm 18 and eccentric wheel 20, the rotation of the motor shaft will cause the mirror to swing slowly back and forth about its edge 16 so that a slow scanning effect is achieved. The arrangement is such that the mirror can be stopped in any position and of course it is unnecessary to reverse the direction of rotation of the motor. In a preferred arrangement the motor may be arranged to perform exactly one revolution when actuated and to then stop so that the mirror will be returned to its starting position in which it will preferably direct the field of view of the device at the area of a visitor's head and shoulders.

I claim:

1. Surveillance apparatus for the control of access to premises, the apparatus comprising a body, an intercom unit mounted in the body, a television camera mounted in the body, a lens mounted on the television camera, image reflecting means mounted in said body in front of the lens and in the optical path of the lens, and pivot means connecting the image reflecting means to the body, whereby a visitor entering the area under surveillance can use the intercom unit to request access and the image reflecting means can then be pivoted about an axis which is in a plane perpendicular to the optical axis of the lens so that the apparatus scans the area to be surveyed.

2. Surveillance apparatus as claimed in claim 1 in which the image reflecting means comprises a plane mirror.

3. Surveillance apparatus as claimed in claim 2 in which the said pivot means comprises a hinge connected to one edge of the mirror.

4. Apparatus as claimed in claim 2 in which the range of movement of the mirror includes a position in which it reflects light through an angle of 90° into the lens.

5. Apparatus as claimed in claim 2 further comprising resilient means connected between the mirror and the body and spaced from said pivot means, whereby the mirror is urged towards one extreme position of its range of movement, and power-operated means adapted to rotate the mirror about its pivot against the action of the resilient means.

6. Apparatus as claimed in claim 2 comprising resilient means connected between said mirror and said body and spaced from mid pivot means whereby the mirror is urged towards one extreme position of its range of movement; an eccentric member mounted for rotation about an axis parallel to the axis of said pivot means; and means transmitting the eccentric motion of said eccentric member to said mirror and urging it away from said extreme position whereby the mirror can be caused to swing about said pivot means by rotation of said eccentric member.

7. Surveillance apparatus comprising a body, a television camera mounted in said body, a lens mounted on said television camera, a plane mirror mounted in said body in front of said lens so as to deflect light rays into the lens; a pivot connecting the mirror to the body, the axis of said pivot lying in a plane which is perpendicular to the optical axis of the lens and spring means connecting said mirror to said body and spaced from said pivot; a motor mounted in the body, an eccentric member mounted on the output shaft of said motor, and means transmitting the motion of said eccentric member to said mirror whereby the mirror may be caused to swing about the pivot, against the action of the spring means, when the motor is caused to rotate.

8. Surveillance apparatus for the control of access to premises, comprising a body, a television camera mounted in the body, a lens mounted on the television camera, image reflecting means mounted in said body in front of the lens and in the optical path of the lens, pivot means connecting the image reflecting means to the body, resilient means connected between the mirror and the body and spaced from said pivot means, whereby the image reflecting means is urged to pivot in one direction about the pivot; and a motor-driven eccentric device adapted to rotate the image reflecting means about its pivot against the action of the resilient means; whereby the resilient means holds the image reflecting means in engagement with the eccentric device, and rotation of the motor in a single direction causes repeated to-and-fro swinging of the image reflecting means about the pivot to provide a scanning effect for the camera.

* * * * *